United States Patent [19]  [11] Patent Number: 5,061,957
Nishikawa et al.  [45] Date of Patent: Oct. 29, 1991

[54] POWER CONTROLLING DEVICE

[75] Inventors: Tomoyuki Nishikawa, Matsudo; Masahiro Kita, Tokyo; Takaaki Yano, Kawagoe; Tatsuya Yoshida, Saitama; Ryoji Honda, Asaka; Kiyoshi Negishi, Saitama; Tsutomu Sato, Tokyo; Shoji Kamasako, Saitama, all of Japan

[73] Assignee: Asahi Kogaku Kogyo Kabushiki Kaisha, Tokyo, Japan

[21] Appl. No.: 611,736

[22] Filed: Nov. 13, 1990

[30] Foreign Application Priority Data

Nov. 10, 1989 [JP] Japan ................................ 1-293712
Apr. 11, 1990 [JP] Japan .................................. 2-98222

[51] Int. Cl.⁵ ........................................ G03G 15/00
[52] U.S. Cl. .................................. 355/200; 355/202; 307/41
[58] Field of Search ............... 355/200, 133, 210, 202; 307/38, 125, 126, 41

[56] References Cited

U.S. PATENT DOCUMENTS 3,737,734  6/1973  Nakamura et al. ............. 355/200 X
3,909,258  9/1975  Kotz .
4,443,709  4/1984  Genuit et al. ......................... 307/41
4,615,609 10/1986  Honma ................................ 355/200
4,640,880  2/1987  Kawanishi et al. .
4,677,310  6/1987  Midorikawa et al. ................ 307/64
4,761,672  8/1988  Parker et al. .

FOREIGN PATENT DOCUMENTS 1349800  4/1974  United Kingdom .
2123343  2/1984  United Kingdom .

Primary Examiner—R. L. Moses
Attorney, Agent, or Firm—Sandler, Greenblum & Bernstein

[57] ABSTRACT

A power controlling device capable of controlling the supply power to a drive system and to a control system for controlling the drive system. The power controlling device is provided with a main switch capable of turning on and turning off the power supplying device. When the power supplying device is turned off by the main switch, the drive system is turned off before the control system is turned off.

10 Claims, 9 Drawing Sheets

POWER CONTROLLING DEVICE

BACKGROUND OF THE INVENTION

The present invention relates to a device for controlling a power supplying device which supplies power to a plurality of systems to be supplied with different voltages.

A power supplying device for supplying current from a 100 volts A.C. power supply to a plurality of DC systems that utilize different voltages. is known When the power supply is turned off and 100 volts a.c. is cut off, for instance, the voltage from the power supply will be attenuated transiently until the voltage settles at 0 volt.

Consequently, the voltages in the two DC systems gradually drop down to 0 volt ultimately. However, as the voltage drop slopes are similar to each other, the low-voltage drops to 0 volt before the high-voltage drops to 0 volt.

When the high-voltage is applied to a drive system with the low-voltage applied to a control system, hunting arises in the course of the high-voltage drop. If the power is supplied to the drive system which is not under the control of the control system as the low-voltage has already dropped to 0 volt, malfunctions such as motor vibration may occur.

SUMMARY OF THE INVENTION

In view of the foregoing problems, an object of the present invention is to provide a power supplying device capable of preventing a drive system from malfunctioning when a main power supply is cut.

To achieve the above object, according to the invention, there is provided a power controlling the device for controlling the power supplying device to supply power to a plurality of systems;

The device includes a main switch capable of turning on and turning off the power supplying device and a controlling mechanism for turning off the plurality of systems in a predetermined order when the power supplying device is turned off by the main switch.

According to another aspect of the invention, there is provided a printer comprising a drive system using a relatively high voltage, a control system using a relatively low voltage for controlling the drive system, and a power supplying device for supplying power to the drive system and to the control system.

the printer further includes a power controlling device capable of turning on and off the power applied to the drive system and control system, a main switch capable of turning on and turning off the power supplying device, and a controlling mechanism for turning off the drive system before the control system is turned off when the power supplying device is turned off by the main switch.

Optionally, the controlling mechanism holds the power supplied to the control system for a predetermined period of time after the power supplying device is turned of by the main switch.

Further, the controlling means comprises a switch device for turning on and off the drive system, the switch device being capable of instantaneously cutting off the power applied to the drive system when the main switch is turned off.

DESCRIPTION OF THE ACCOMPANYING DRAWINGS

DESCRIPTION OF THE EMBODIMENTS

FIGS. 1 through 12 shows a printer including a power supplying device embodying the present invention.

Figure 1:
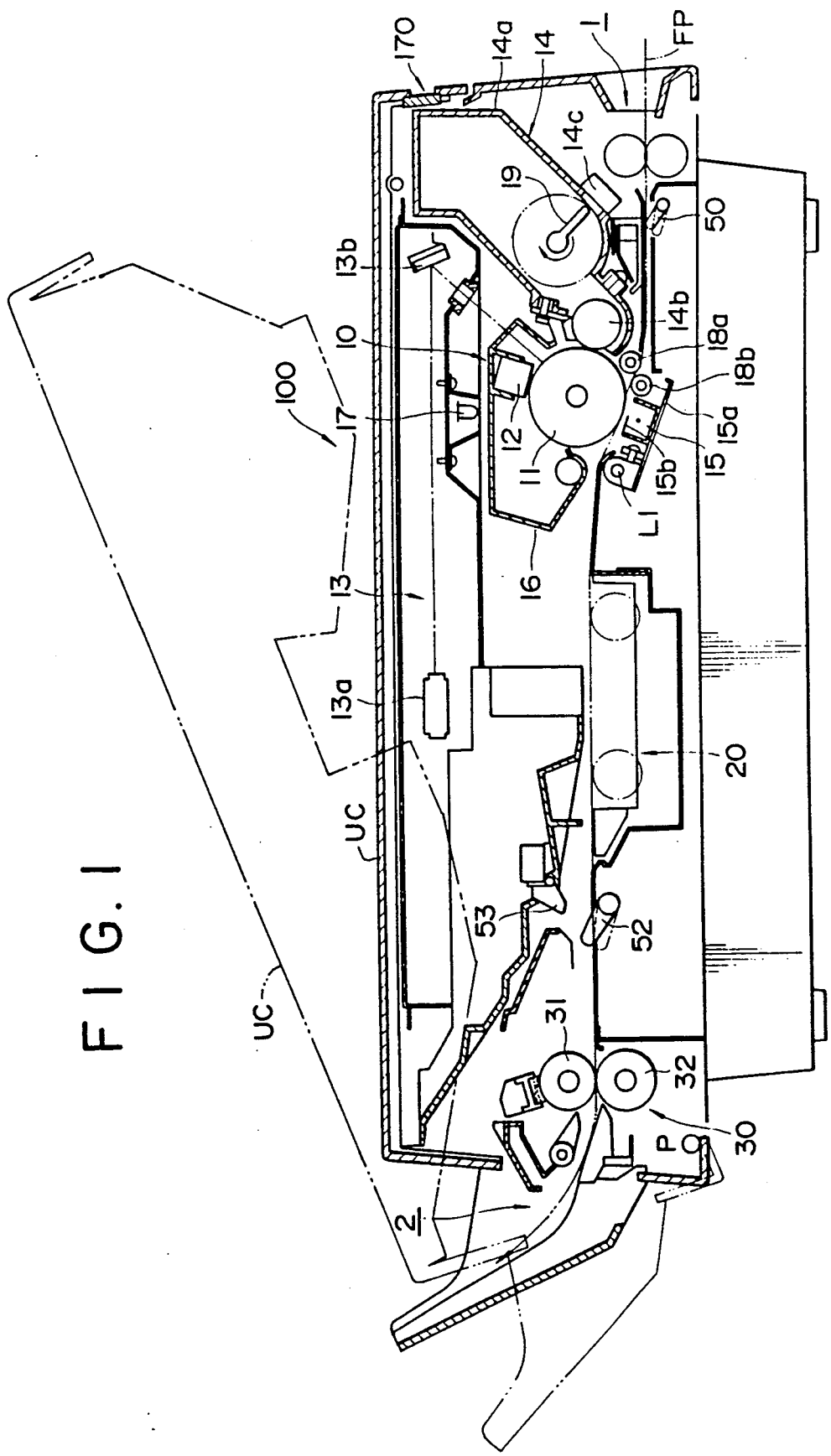
FIG. 1 is a schematic sectional view of a printer including a power supplying device embodying the present invention.

The printer 100 shown in FIG. 1 is a laser beam printer employing an electrophotographic image transfer system. The printer 100 comprises, in sequence, a transfer unit 10 including a photoconductive drum 11, a tractor unit 20 having an endless belt 21 for feeding a recording sheet, and a fixing unit 30 having a pair of rollers 31, 32 for heating and pressing an unfixed toner image in order to fix it onto the recording sheet. Light carrying printing data from a host computer or the like is emitted from a laser scanning unit (LSU) 13, the charged circumferential surface of the photoconductive drum 11 is exposed to the light and a latent image is formed on the circumferential surface of the photoconductive drum 11. Toner is adhered to the circumferential surface of the photoconductive drum 11 by a developing unit 14 to develop a toner image. Then the toner image is transferred onto the recording sheet at a transfer charger 15, and the image thus transferred is fixed by a fixing unit 30. The printer 100 employs the electrophotographic image transfer system, and so it is designed to be a page printer which starts printing after the printing data for one page is accumulated. The laser scanning unit 13 is secured to an upper cover UC. The upper cover UC is rotatably disposed on the main body of the printer 100 so that it can be rocked around a pivot axis P.

This printer 100 uses a continuous form recording sheet FP, which is known as fan-fold sheet. The fan-fold is a foldable continuous sheet having feed holes at both side ends, and perforated tear lines along which the recording sheet FP is easily cut off. Projections are provided on the endless belt 21 which are fitted into the feed holes of the continuous form recording sheet FP. The continuous form recording sheet FP is fed from a feed port 1 to a discharge port 2. It should be noted that the printer 100 is designed to print pages between the perforations in order to prevent printed data from tearing apart when the recording sheet FP is torn off at the perforated tear lines.

In the case of a printer using a cut-sheet, the distance between transferring position and fixing position is not so important because printing data for one page is printed onto one sheet of recording paper. On the other hand, in a printer using a continuous sheet, if the whole portion of the sheet carrying an unfixed toner image is caused to pass through the fixing position and fixed, the paper may be wasted to the extent of the distance between transfer and fixing positions. Consequently, it is necessary to determine the portion of the sheet carrying a toner image to be fixed. In other words, it is necessary to determine the portion of the sheet carrying an unfixed toner image to remain in the printer between the transfer and fixing positions.

When the printing quality is taken into consideration, interruption and resumption of transfer and fixing should preferably be made at the perforations where data is not printed. For this reason, the distance between the transfer position and the fixing position is preferably arranged equal to the length of one page so that the perforations are located at the transfer and fixing positions when printing is stopped.

As arranged above, the portion carrying an unfixed toner image for one page remains between the transferring and fixing positions in a standby state when printing is terminated. When another page is printed, the unfixed toner image is fixed and the page that remained between the positions is discharged. In this way, waste of paper due to the immediate fixing of every transferred image, becomes avoidable.

The distance between the transferring and fixing positions of the printer 100 is set to be eleven inches long for a continuous recording sheet having a page length which is eleven inches long.

The transfer unit 10 comprises the charger 12 for charging a photoreceptive material on the circumferential surface of the photoconductive drum 11 with electricity and the laser scanning unit 13 for exposing the charged circumferential surface of the photoconductive drum 11 to light. Further, a developing unit 14 for adhered toner to the latent image formed on the photoconductive drum 11, a transfer charger 15 for charging the recording sheet FP with electricity to cause to toner image to be transferred to the recording sheet FP, and a cleaning unit 16 for removing the residual toner on the drum are also provided. A discharging LED 17 is provided for exposing the entire photoconductive drum 11 to light so as to remove the residual charge therefrom.

The photoconductive drum 11 should be exchanged after being used for printing a certain number of pages, since in its properties will deteriorate and fail to provide clear printing. For example, a use limit is set at approximately 20,000 pages. The number of printed pages are electrically counted and recorded in a counter by a control system which is described later. This counter is reset when the upper cover UC is shut after a new photoconductive drum 11 is installed.

An outwardly protruding projection (not shown) is provided on a new photoconductive drum 11. As the projection depresses a reset switch, not shown, on the body side, the control system can detect that the new photoconductive drum 11 is placed in position. The projection retracts when the operation is started and an indication of the installation of the new drum disappears. The control system resets the counter when the upper cover UC is shut after the reset switch is turned on.

The laser scanning unit 13, which is secured in the upper cover UC, continuously deflects ON/OFF-modulated beams from a semiconductor laser (not shown) by means of a polygon mirror 13a. The laser beams are converged by means of a f$\theta$ lens (not shown) and reflected by a beam bender 13b so that scanning lines are formed on the photoconductive drum 11. Then, an electrostatic latent image on a dot basis is formed as the drum rotates.

The developing unit 14 comprises a toner case 14a in which toner is accumulated and a developing roller 14b for adhered the toner onto the circumferential surface of the photoconductive drum 11 is provided at the lower end of the case 14a. A piezoelectric sensor, acting as a low toner sensor 14c for detecting the presence or absence of the toner in the case 14a. is also provided In normal text printing, the printing of letters are started from the left-hand side of paper so that frequency of use of toner normally tends to become high in a portion corresponding to the left-hand side of the paper. For this reason, the toner low sensor 14c is provided in the portion corresponding to the left-hand side of the paper where the toner consumption is large.

Heretofore, two dry development methods have been generally known. One of them is a so-called monocomponent development method, and the other is a two-component development method.

In the two-component development method, carrier is mixed with toner, and stirred at relatively high speed by a scraper or the like, in order to charge the toner.

On the other hand, in the monocomponent development method, toner is fed to a developing roller or the like without using carrier for charging the toner. This monocomponent development method is disclosed in the U.S. Pat. No. 3,909,258. However, there is a problem in this monocomponent development method. That is, the toner tends to form a block in a toner box. In order to overcome the above problem, an improved monocomponent development method, in which a relatively small amount of carrier is mixed with the toner, is disclosed in the U.S. Pat. No. 4,640,880. With the mixture of a small amount of carrier with the toner, lubrication between the toner grains is improved, which prevent the toner from forming blocks. It should be noted that the mixture of the carrier does not affect chargeability of the toner. In this improved monocomponent development method, the main function of the scraper is to feed the toner to the developing roller or the like. Accordingly, the scraper rotates relatively slowly in the toner box. The above-said improved monocomponent development method is employed in the present printer of the embodiment.

Figure 3:
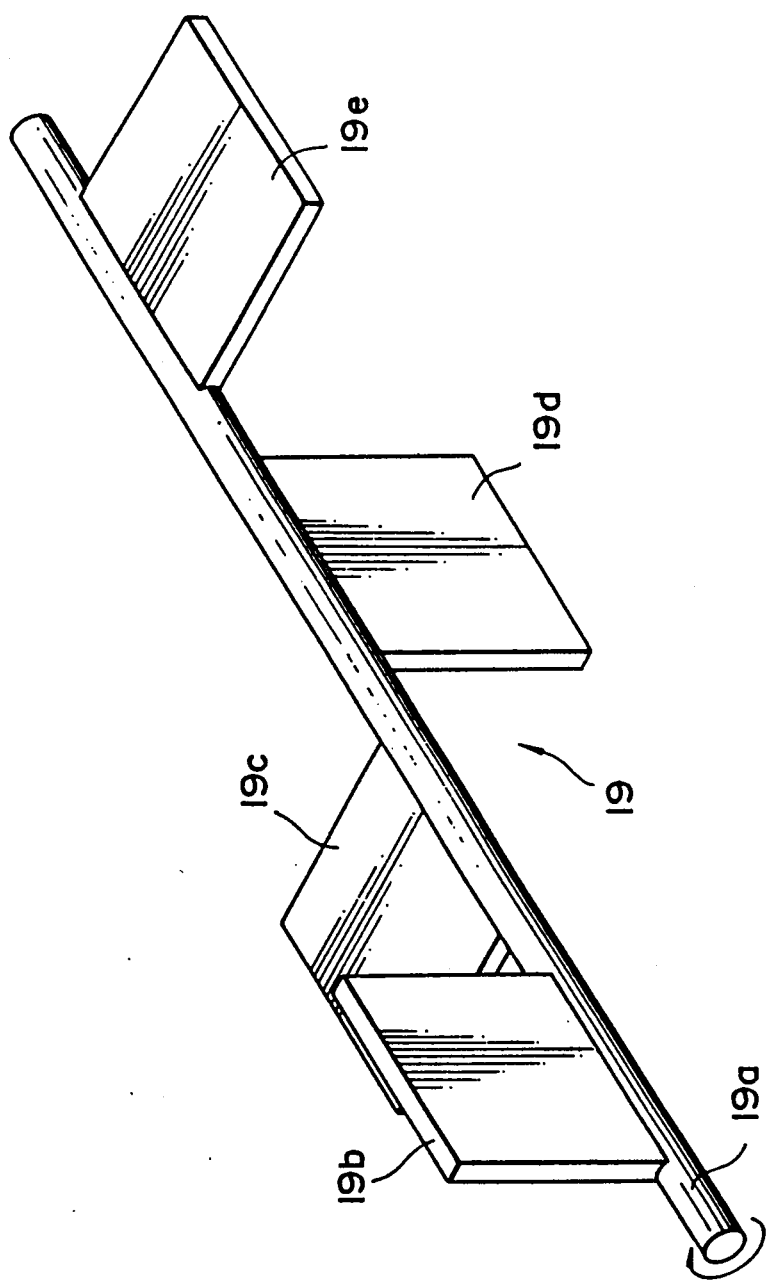
FIG. 3 is a perspective view of a scraper provided in a toner box of the printer.

A scraper 19 is provided in the toner case 14a. The scraper 19 slowly rotates to supply the toner to the developing roller 14b. The scraper 19 is, as shown in FIG. 3, composed of a rotary shaft 19a to be driven by a main motor, and four blade elements 19b, 19c, 19d, 19e positioned such that the angle between the surfaces of the blades 19b and 19c is 90 degrees, that of the blades 19b and 19d is 180 degrees, and that of the blades 19b and 19c is 270 degrees. In this specification, this angle will be called a mounting angle, i.e., the mounting angles, with respect to the blade 19b of the blades 19b, 19c, 19d, and 19c degrees, 180 degrees, and 270 degrees, respectively. The blades 19b through 19e are driven to rotate in the direction of an arrow shown in FIG. 3.

Since the four blades are arranged to have different mounting angles, the load applied when the toner is forced out is one-quarter that of the conventional scraper having all the blades set to have the same mounting angles. Consequently, the load applied on the motor decreases and fluctuates less with the scraper of this embodiment, thus suppressing noise generation.

By sequentially making the mounting angles of the blades of the scraper 19 different, as stated above, a certain amount of toner can be gradually moved to a portion corresponding to the right-hand side of the paper as the scraper 19 slowly rotates.

When toner consumption in the portion corresponding to the right-hand side of the paper increases when it is used for an graphic output, for instance, a toner low condition is left undetected by the toner low sensor 14c. In such a case, as the conventional scrapers do not function to move the toner in the manner stated above, carrier may be transferred onto the circumferential surface of the photoconductive drum 11.

According to the scraper in this embodiment, the occurrence of the carrier being transferred on the photoconductive drum 11 is avoid even when the toner consumption is large on the side where the toner low sensor 14c is not provided.

The transfer charger 15 is secured to an arm 15a which can be rotated by a cam mechanism around a pivot shaft L1. Moreover, a pair of guide rollers 18a, 18b are integrally secured to the arm 15a, the guide rollers 18a, 18b being laterally positioned so that the continuous form recording sheet FP is nipped therebetween.

When printing is started, the photoconductive drum 11 must be idly rotated without feeding the recording sheet until the exposed portion of the photoconductive drum 11 is located at the transfer position. In this case, the arm 15a is moved down to lower the guide rollers 18a, 18b, and accordingly, the recording sheet FP is retracted from the circumferential surface of the photoconductive drum 11. The life of the photoreceptor material is thus prevented from being shortened because of wear. In addition, the paper is also prevented from being soiled by residual toner on the photoconductive drum 11.

An opening is formed in the transfer charger 15. The opening of the transfer charger 15 is arranged so that its rearward half, in the feeding direction of the recording sheet FP, is covered with a Mylar film 15b, and the discharging area, which is uncovered, of the transfer charger 15 is arranged at the upstream side, in the rotational direction of the photoconductive drum 11 with respect to the contact portion between the photoconductive drum 11 and the recording sheet FP.

Conventionally, the whole opening of the transfer charger has been left opened for charging. With such a setting, however, transfer efficiency tends to considerably vary as ambient humidity changes.

By narrowing the discharge area, corona discharge efficiency can be increased to prevent toner from being reversely charged under the influence of the corona discharge. Moreover, the period of time in which the recording sheet FP contacts the photoconductive drum 11 under pressure after the toner image is transferred thereto can be set longer than in conventional printers. As a result, transfer efficiency in throughout the whole humidity range can be, by far improved. Experiments show that the transfer efficiency is improved to a great extent, especially when humidity is low. It is also possible to arrange the transfer charger 15 itself towards the upstream side in the sheet feed direction in order to prolong the period of time for applying pressure after transfer.

Figure 2:
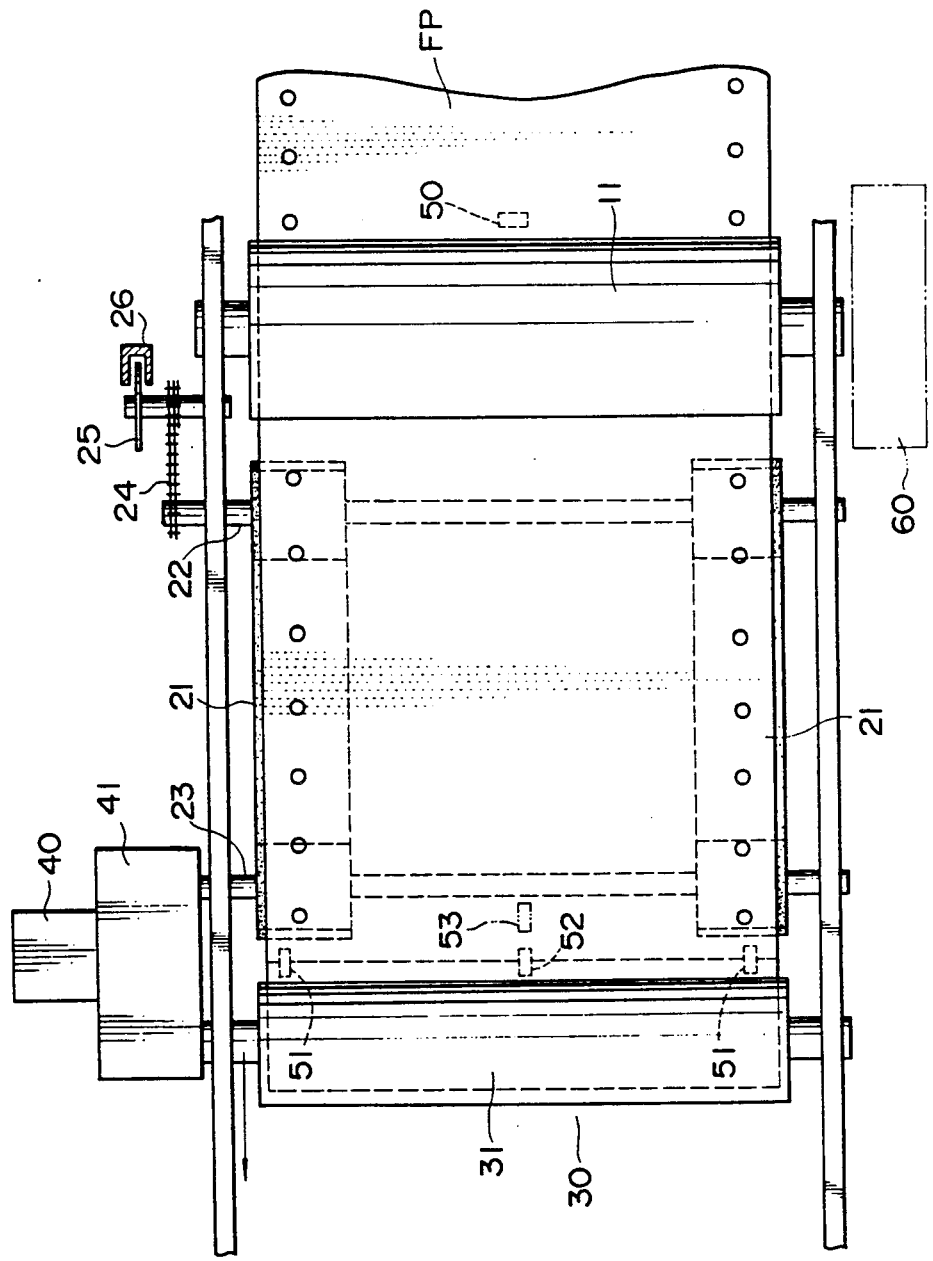
FIG. 2 is a top view of the paper conveying portion of a printer of FIG. 1.

The toner adhering to the photoconductive drum 11 is not totally removed therefrom after the termination of the transfer process. As the residual toner is unnecessary for next printing, it is removed by a cleaning unit 16. The waste toner thus removed is stored in a waste toner box 60 detachably fitted to the side of the photoconductive drum 11, as shown in FIG. 2.

When a certain amount of waste toner is accumulated in the waste toner box 60, it overflows into the printer, unless it is discarded. The waste toner may soil the inside of the machine if printing is started without the waste toner box 60.

In conventional printers, sensors have been used to respectively detect the presence or absence of such a waster toner box 60 and the full condition of the waster toner box 60. However, the plurality of sensors thus required tends to render the control system complicated.

In the printer according to the present embodiment, only one sensor is used to detect both conditions.

Figure 4:
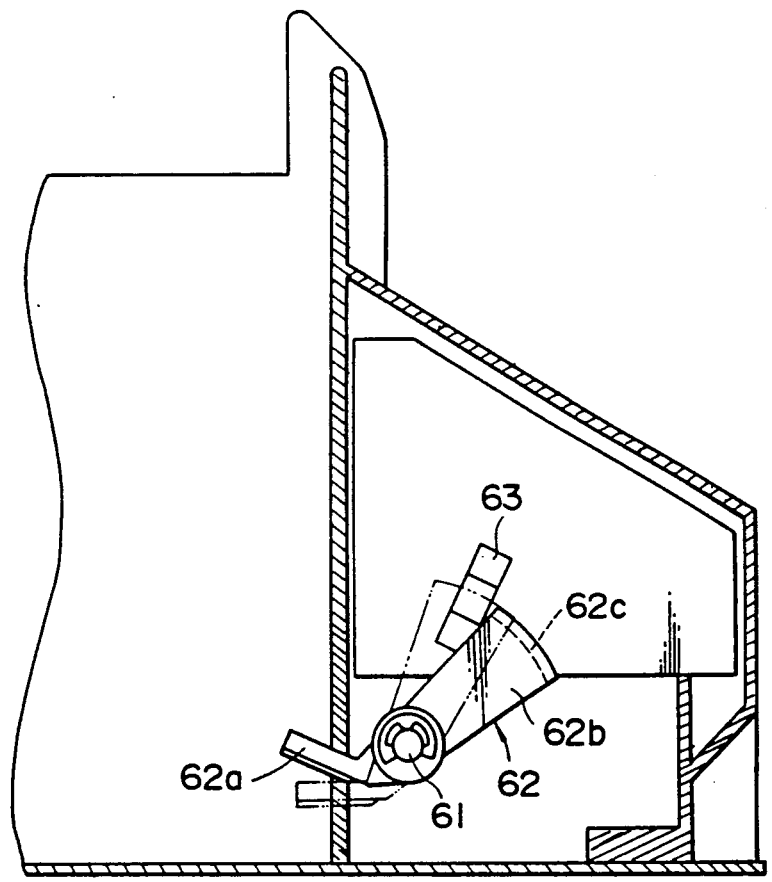
FIGS. 4 and 5 are side views of the waste toner sensor.

FIG. 4 illustrates the detecting mechanism. The waste toner box 60 is movably inserted and guided by a portion of the body, the waste toner box 60 being vertically movable. An actuator 62 is rotatably pivoted with a fulcrum 61 on the body such that a contact portion 62a is located at a position where the bottom side of the waste toner box 60 is located. A fan-shaped portion 62b is provided at the other end of the rod 62, and a light-shading or light block wall 62c is formed on the arcuate peripheral edge of the fan-shaped portion. The light-shading or blocking wall 62c is capable of crossing the space between a light receiving element and a light emitting element of a photo-interrupter 63.

If the waste toner box is not attached, the rod 62 is caused to revolve clockwise by its own weight as shown by a continuous line in FIG. 4 so that its contact portion 62a ascends and the light-blocking wall 62c is located under the photo-interrupter 63. In this state, the photo-interrupter 63 produces a signal indicating that no rays of light are blocked and the control system determines that an error relating to the waste toner box 60 has occurred.

When the waste toner box 60 is attached, the contact portion 62a is forced down by the weight of the box and the rod is revolved counter-clockwise up to a substantially horizontal state as shown by a broken line in FIG. 4. The light-blocking wall 62c is set in a position where it blocks the photo-interrupter 63. In this state, the photo-interrupter produces a signal indicating that the rays of light are blocked and the control system determines that no error relating to the waste toner box 60 has occurred.

Figure 5:
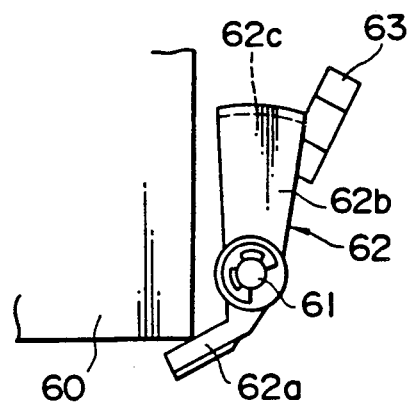

When the waste toner box 60 is filled with the waste toner, the contact portion of the rod is caused to descend due to the weight of accumulated toner as shown in FIG. 5 and the light-blocking wall 62c moves up to the left-hand side of the photo-interrupter 63. In this state, the control system again determines that an error relating to the waste toner box 60 has occurred.

In this way, one sensor can be used to detect that the waste toner box 60 is not installed and that the waste toner box 60 is filled with the waste toner. Although this sensor is arranged as to monitor the presence or absence of the waster toner box and the amount of waste toner from the balance in weight between the rod 62 and the waste toner box 60, it is possible to employ a spring or the like to maintain the balance as well as the dead load of the rod 62.

The tractor unit 20 is arranged so that, as shown in FIG. 2, the two endless belts 21, 21, stretched between a driving shaft 22 and a driven shaft 23 are driven by the main motor 40 via a field clutch (not shown, hereinafter called the F clutch) and a gear train (not shown) provided in a box 41.

The gear train extending from the main motor 40 to the drive shaft 23 in the tractor unit 20 is arranged so that the continuous recording sheet FP is fed at the velocity of 50 mm/sec., if the tractor unit 20 alone feeds the recording sheet FP. Moreover, the gear train contains a unidirectional clutch which races with a predetermined resistance in compliance with a tension when the paper is drawn at a rate higher than 50 mm/sec. to prevent the paper from overdriving the motor 40.

Figure 6:
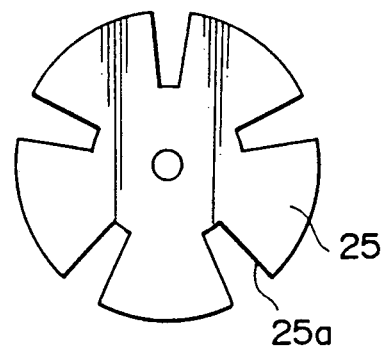
FIG. 6 shows a disc for use in generating PFS pulses.

The driven shaft 22 is connected with a disc 25 via a chain 24. The disc 25 is rotatable in response to the rotation of the driven shaft 22. As shown in FIG. 6, the disc 25 is provided with slits 25a which are spaced from each other by a predetermined distanced. The disc 25 is positioned between the light emitting member and the light receiving member of the photo-interrupter 26, and a pulse corresponding to the amount that the recording sheet FP has moved, is obtainable. The photo-interrupter 26 is hereinafter called the PFS (Paper Feed Sensor) with its output as a PFS pulse.

The PFS pulse is outputted such that when the recording sheet is fed by ½ inch, one pulse is outputted. Further, the signal corresponding to the slit portion 25a, and the signal corresponding to the portion other than the slit 25a, correspond to the perforated lines of the continuous recording sheet FP and the non-perforated portion, respectively.

Notwithstanding, the positional relation between the disc 25 for generating the PFS pulse and a base plate on which the photo-interrupter 26 is mounted may not be the same in individual printers because of assembly errors. If the slits 25a, formed in the disk 25, are rectangular along the radius, the pulse width thus outputted may vary, depending on where the photo-interrupter 26 has detected the slits 25a in the radial direction of the disc 25, and depending on the relative position between the disc 25 and the photo-interrupter 26.

As this printer is arranged so that the paper feed error is judged from the detection of the PFS pulse, the variation of the pulse width may result in misjudgment of the error.

For this reason, the slit 25a formed in the disc 25 is fan-shaped so that its width gradually increases toward the circumference. In other words, the slit 25a is defined by a pair of radii of the disc 25. With this fan shape, the width of the pulse thus outputted can be unified (i.e., the ratio between slit 25a and the non-slit portion remains constant) irrespective of the position where the photo-interrupter has detected the slit in the radial direction of the disc 25, thus preventing the misjudgement of error. In addition, the assembly precision required is eased and hence assembly workability is improved.

Sensors for detecting paper errors will subsequently be described.

In a conventional laser printer using cut sheets, two sensors are provided along a sheet feed path to detect the jamming of recording sheet. Paper errors are detected when the sheet does not pass the down-stream side sensor a predetermined time after it passes the up-stream side sensor. Since there are no breaks in the continuous recording sheet, the aforementioned method of detection cannot be utilized in a printer using a continuous recording sheet.

In this printer 100, four kinds of sensors are provided for detecting the presence or absence of the paper along the sheet feed path. The sheet empty and paper jamming conditions are detected by detecting the changing of a sheet feed speed and the lifting of the sheet.

The first sensor is an empty sensor 50 provided between the feed port 1 and the transfer unit 10. This printer sheet 100 does not print on the portion adjacent to the perforated lines which are used as a break between pages. The perforated lines are located right under the photoconductive drum 11 of the transfer unit 10 and at the position of the fixing rollers 31, 32 when printing is stopped in this printer 100. The sheet empty condition can be detected from the output of the empty sensor 50 when the last page of the recording sheet FP is located in the printer. Moreover, it is detectable by counting the PFS pulses for portions of the recording sheet positioned at the transfer unit 10, at the fixing unit 30, and further at the empty sensor. Consequently, the counting of the PFS pulse and the output of the empty sensor 50 can be used to detect the recording sheet FP being torn off at a non-perforated portion.

The second sensor comprise skew sensors 51, 51 provided between the fixing unit 30 and the tractor unit 20. The skew sensors 51, 51 are used for detecting the skewing and cutting-off of the continuous recording sheet FP. The sensors 51, 51 are capable of detecting the sheet when at least one side thereof lifts up.

The third sensor is a top sensor 52 provided in the central part of the sheet between the skew sensors 51, 51. The top sensor 52 is used for detecting the leading end of the paper when the printing is started. After the predetermined number of pulses has been counted after the leading end of the recording sheet FP passed the top sensor 52, the leading end thereof reaches the fixing unit 30, whereas the following perforations are positioned at the transfer unit 10.

The fourth sensor is a jam sensor 53 provided in the upper cover UC substantially opposite to the top sensor 52 with the sheet feed path therebetween. The jam sensor 53 is used for detecting the sheet when the sheet is jammed in the fixing unit 30 and the central part of the recording sheet swells out to contact the jam sensor 53.

The fixing unit 30 comprises a heat roller 31 provided in the upper portion of FIG. 1, and a press roller 32. The continuous recording sheet FP is nipped between the rollers 31, 32, and is pressed against the heat roller 31 by the press roller 32 with a predetermined pressure. In the heat roller 31, a heating halogen lamp, and a thermistor for temperature detection are provided.

The heat roller 31 is driven by the main motor 40 to rotate via the F clutch and the gear train and arranged so that, when the continuous recording sheet FP is held between the rollers 31, 32, it is fed at the speed of 75 mm/sec.. As a result, the continuous recording sheet FP is actually driven by the fixing unit 30, whereas the tractor unit 20 mainly functions to prevent skewing of the continuous recording sheet FP.

If the continuous recording sheet FP is kept pressed against the heat roller 31 while printing is in standby state, the paper may be scorched with the heat of the heat roller 31. In order to avoid scorching of the sheet, in this printer 100, the press roller 32 facing the heat roller 31 is made vertically movable so that the continuous sheet is retracted from the heat roller 31 while printing is in the standby state.

The rocking of the press roller 32 and of the transfer charger 15 are implemented by the same drive means.

Figure 7:
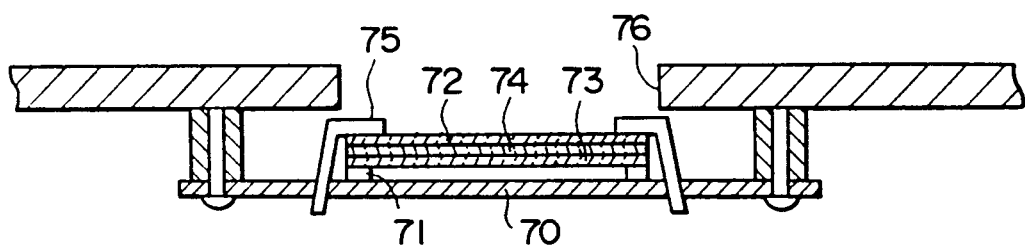
FIG. 7 illustrates a construction of the conventional liquid crystal display panel.

A general liquid crystal display panel heretofore in use is, as shown in FIG. 7, is built by mounting two glass plates 72, 73 on a substrate 70 via conductive rubber member 71 and nipping a layer of liquid crystal 74 between the glass plates 72, 73. Moreover, the edges of the glass plates are enclosed with a frame 75, which is secured to the substrate 70. The substrate 70 is secured with screws onto the body so that the display panel can be viewed through an opening 76.

The arrangement stated above, however, has posed a problem in that the increased number of parts makes it troublesome to assembly the display unit.

Figure 8:
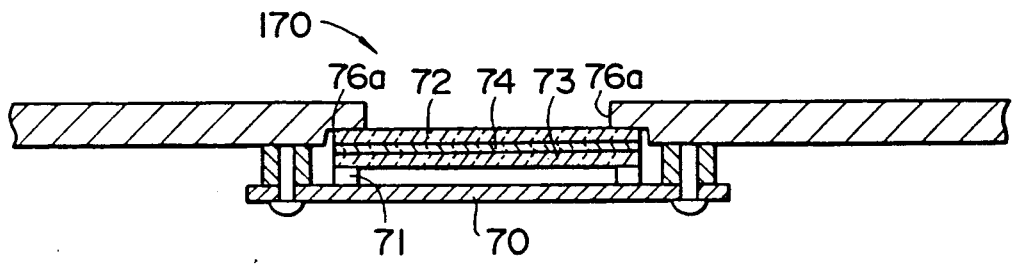
FIG. 8 shows the construction of a liquid crystal display panel of the printer of FIG. 1.

In liquid crystal display unit 170 of this embodiment, there is provided a stepped portion in the peripheral edge of the opening 76 of the body as shown in FIG. 8. While the glass plates 72, 73 between which the liquid crystal layer 74 is inserted are directly mated with the stepped portion 76a, the combination is secured with screws onto the body. With this arrangement, the frame can be omitted, so that the number of parts is reduced.

Figure 9:
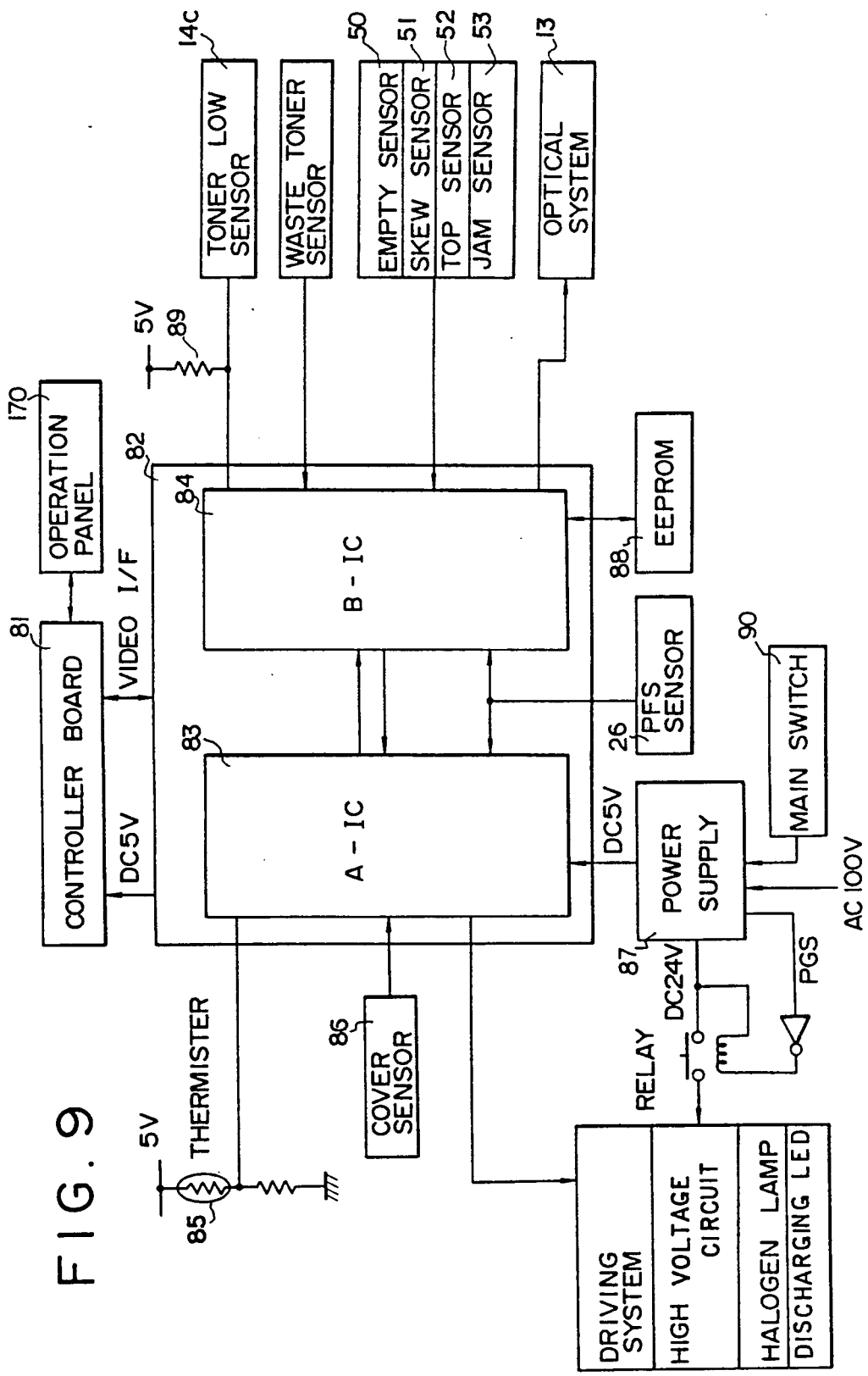
FIG. 9 is a block diagram illustrating a control system in the printer of FIG. 1.

FIG. 9 shows the control circuit of the printer.

This circuit comprises a controller board 81 for developing the printing data received from a host computer into a map on a dot basis and outputting the map, and a driver 82 comprising two CPU's: one of which is A-IC 83 mainly for controlling printing; and the other is B-IC 84 mainly for error detection. The controller 81 is provided with a buffer which is capable of developing printing data corresponding to six pages of the recording sheet. New data is successively written to the buffer from time to time as the data is transferred to the driver.

The controller 81 and the driver 82 are connected via a video interface (video I/F) for transferring printing data and by a command line transmitting various data.

The A-IC 83 is connected with a high voltage circuit which biases for the charger 12 and the like in the transfer unit further, a drive system, including the main motor 40, the F clutch 41, the halogen lamp in the heat roller 31 are connected to the A-IC to be controlled thereby.

A thermistor 85 for detecting the temperature of the heat roller 31, a cover sensor 86 for detecting the opening and closing of the upper cover UC, and the PFS sensor (or photo-interrupter) 26 are connected to the A-IC as the sensors for supplying data to the A-IC.

The heat roller 31 is controlled as to have a high temperature as the fixing temperatures only during printing, and a low temperature as a standby temperature is employed when the printer is in a standby state to save power and to prevent the printer temperature from rising.

Power is supplied to the halogen lamp provided in the heat roller 31 as a heat source from the power supply 87 for supplying 100 volts a.c.. The power supply is turned ON/OFF by a signal from the A-IC 83. The A-IC 83 receives an analog output from the thermistor provided adjacent to the heat roller 31 and executes A/D conversion so as to execute temperature control.

Figure 10:
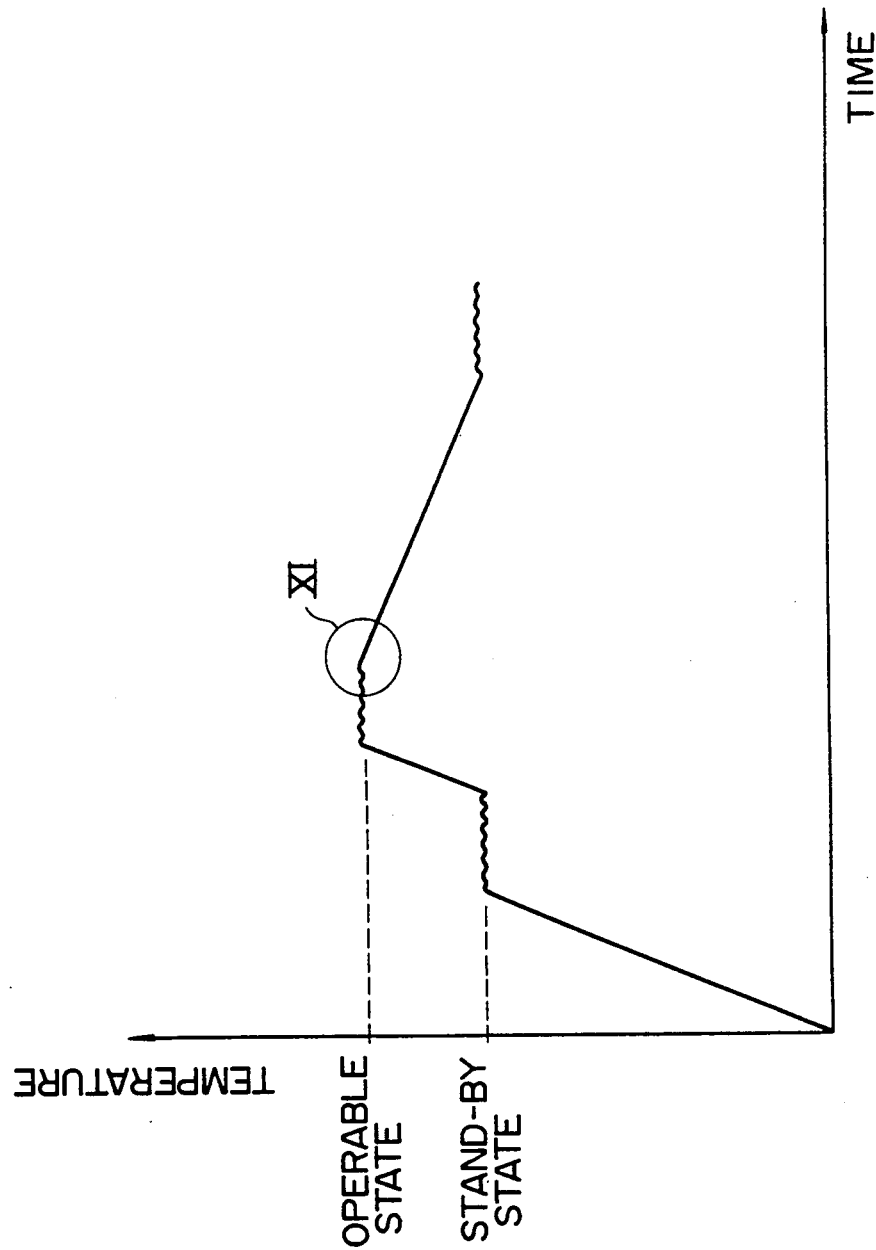
FIGS. 10 and 11 are graphs illustrating temperature control of the heat roller for the printer of FIG. 1.

The temperature control is effected with an allowance of approximately ±5 degrees. As a result, the actual temperature of the heat roller 31 fluctuates within upper and lower limits as shown in FIG. 10. Accordingly, there is a difference in the time required to lower the temperature to a certain value which depends upon the actual temperature of the heat roller 31. If the actual temperature of the heat roller 31 is at the upper limit of the fixing temperature, the time required to lower the temperature to the certain temperature is relatively long; while, if the actual temperature is at the lower limit of the fixing temperature, the time is relatively short. In another aspect, the temperature of the heat roller 31, after a predetermined time has past, varies depending upon the temperature of the heat roller 31 when the temperature began to be lowered. It is obvious that more warm-up time will be required to raise the temperature of the heat roller 31 to the operable (fixing) temperature from the lower temperature than from the higher temperature.

Figure 11:
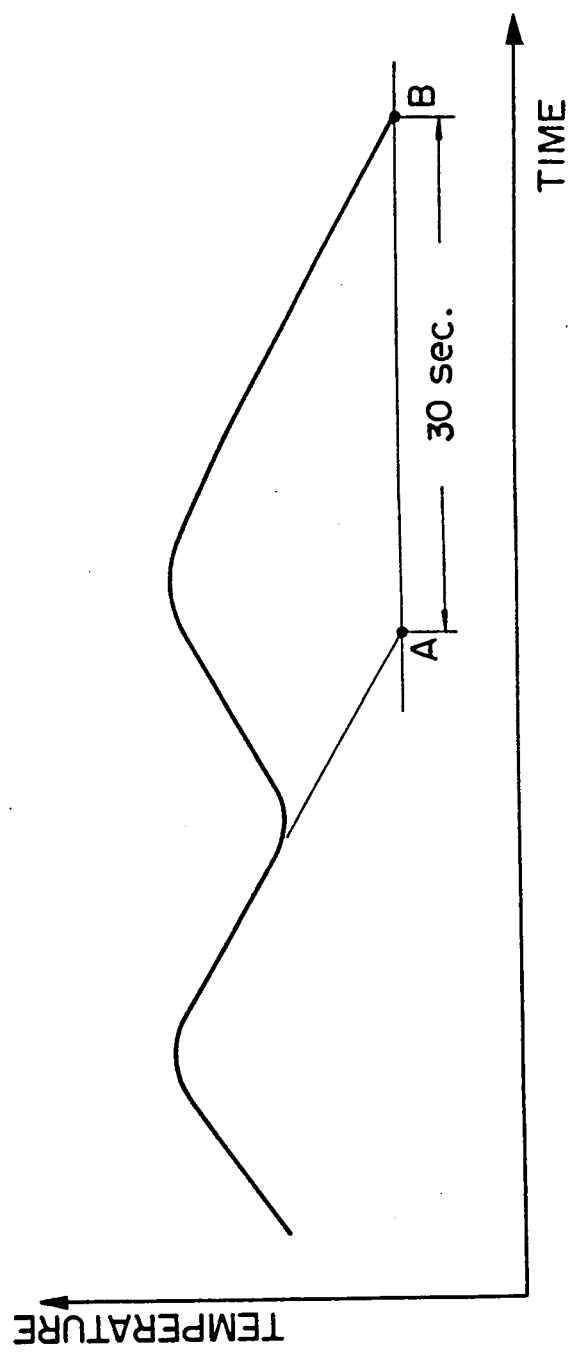
Figure 12:
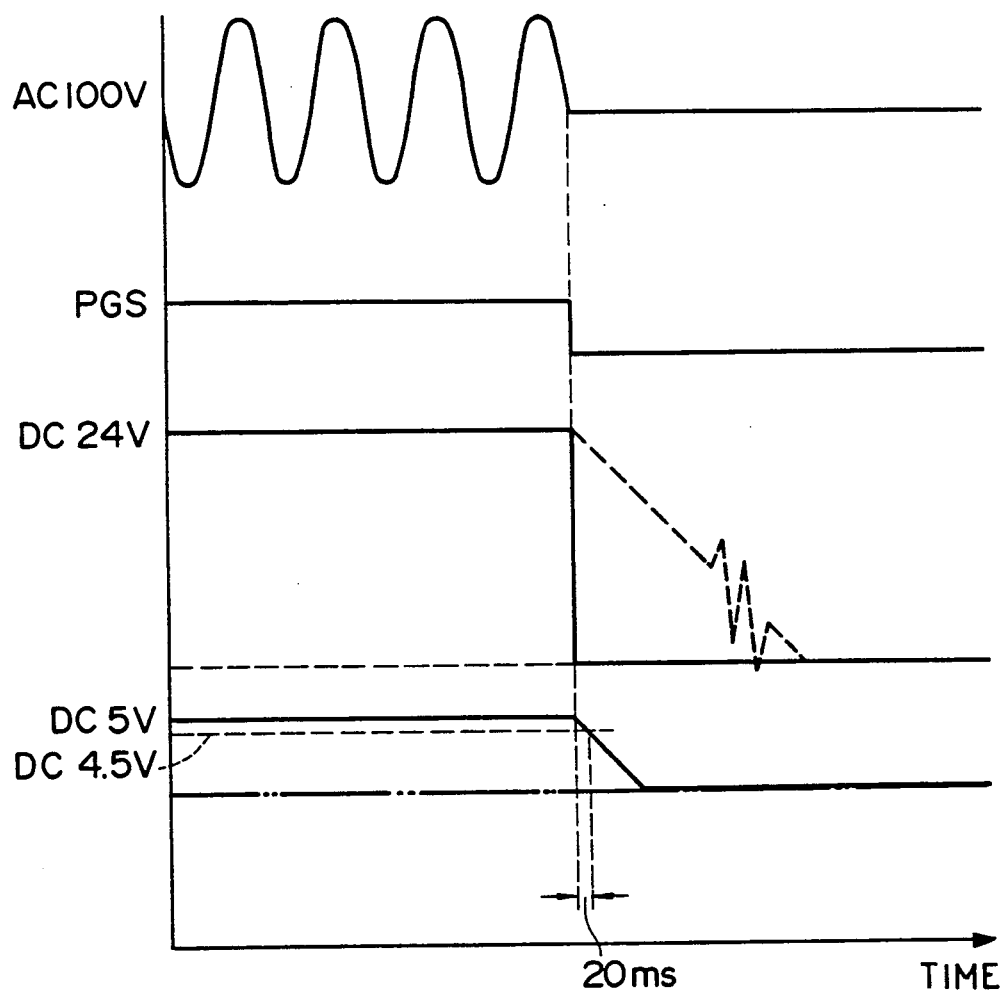
FIG. 12 is a graph illustrating power supply control of the printer according to the present invention.

FIG. 11 shows the difference between two cases when the temperature of the heat roller 31 is lowered to a predetermined temperature set between the fixing and the standby temperatures. Point A shows a point where the temperature falls to a predetermined temperature, starting from the lower limit of the fixing temperature; Point B shows a point where the temperature falls to a predetermined temperature, where the temperature is raised to the upper limit, then lowered from the upper limit. In this example, there are approximately 30 seconds between the points A and B.

In the printer of this embodiment, when the temperature is lowered from the fixing temperature to the standby temperature, the temperature is first raised up to the upper limit of the fixing temperature before being lowered. In this way, the temperature is prevented from being lowered from the relatively low temperature within the fixing temperature range so that the warm-up time required to raise the temperature back up to the fixing temperature again, can be shortened.

The B-IC 84 is connected with the semiconductor laser of the laser scanning unit 13 and an EEPROM 88 for storing printer life data.

As to means for inputting data to the B-IC 84, the empty sensor 50, the skew sensor 51, the top sensor 52 and the jam sensor 53 which are concerned with the paper feeding are connected to the B-IC 84. In addition, the B-IC 84 is connected with the waste toner sensor for warning of the presence or absence of the waste toner box 60 and the amount of accumulated waste toner, and the toner low sensor 14C for warning of the shortage of toner, which are provided in the transfer unit 10 as those sensors concerned with toner.

As to the toner low sensor in a conventional laser printer, it is common practice to set the sensor to output a low level signal when no toner is detected. With this arrangement, however, when the sensor is disconnected, the low level signal indicating the toner low condition cannot be detected. In other word, the disconnection of the sensor and the toner-sufficient condition cannot be distinguished in the conventional printer.

In this embodiment, the toner low sensor 14c outputs a high level signal when toner low is detected, while the B-IC 84 receives the signal in a pull-up state by use of a pull-up resistance 89, for receiving the signal in the pull-up state.

HIGH is thereby inputted to the B-IC 84 when toner low is detected by the sensor 14c, when disconnection occurs in the sensor system and when the developing unit 14 installed with the toner low sensor 14c not attached to the printer 100. In other words, a number of symptoms can simultaneously be detected with one sensor 14c.

The toner low sensor 14c comprises the piezoelectric element incorporated in the bottom surface of the toner case 14a and it outputs a LOW level signal on sensing the pressure applied by the toner accommodated in the toner case 14a; and a HIGH level signal without such pressure.

When sufficient toner is stored in the toner case 14a, the toner is always placed on the piezoelectric element as the toner low sensor 14c, despite the operation of the scraper 19, and the LOW level signal is always outputted. On the other hand, when the amount of toner is low, the HIGH level signal is outputted irrespective of the operation of the scraper 19.

If the toner case 14a is substantially half filled with the toner, the toner is alternately placed on and swept off of the toner low sensor 14c as the scraper 19 slowly rotates, thus causing alternative output of the LOW and HIGH signals. Monitoring the duty ratio of the output of the toner low sensor 14c, the B-IC 84 judges the amount of the toner to be low when the HIGH signal exceeds 80 percent.

As the toner is not supplied onto the developing roller 14b by the scraper 19 immediately after power is supplied, the output of the toner low sensor in the first three seconds, for two rotations of the scraper, is ignored. After the elapse of the three seconds, the toner low sensor 14c starts monitoring. Misjudgement of the toner low condition can thereby be prevented before the operation of the scraper 19, when power is supplied.

The A-IC 83 and the B-IC 84 control the printer 100 by exchanging data via a plurality of signal lines. From the B-IC 84 to the A-IC 83, signals, such as a signal indicating that the B-IC 84 is in a standby state, a STOP signal for immediately stopping the operation of each unit of the printer 100 when an emergency error occurs, even if the printing is being executed, and a PAUSE signal, for stopping the operation of each unit after the predetermined operations, when a less urgent error occurs are transmitted.

On the other hand, error signals indicating errors in the drive system is transmitted from the A-IC 83 to the B-IC 84.

The B-IC 84 analyzes errors detected by itself and the errors transmitted from the A-IC 83 thereto, then determines their degrees of emergency in accordance with predetermined standards. The B-IC 84 selects the STOP or PAUSE signal depending on the degree of emergency, and then transmits the signal to the A-IC 83. The less urgent errors are the errors of toner overflow, toner low and paper empty, while the other errors are treated as emergency errors.

One hundred volts a.c. is supplied to the printer, the control system being driven at 5 volts d.c., and the driving system, such as a motor, being driven at 24 volts d.c.. When a main switch 90 of the printer 100 is turned off, the voltage gradually drops from 24 volts d.c. to ultimately 0 volt as shown by a broken line in FIG. 12.

The 5 volts d.c. power supply for the control system is so designed that more than 90 percent of the rated voltage (i.e. 4.5 volts d.c.) is held at least 20 msec. for storing data after the main power supply is turned off. Because, if the voltage becomes less than 90 percent of the rated voltage, the control system may fail to control driving system.

As to the 24 volts d.c. power supply for the driving system, the voltage tends to fluctuate while it drops because of the operation of a protection circuit on the power supply side. Further the control system does not operate as 5 volts d.c. is cut off at that point in time, which may cause vibration of the motor and hence malfunctions.

In this printer 100, the voltage applied to the driving system is instantaneously dropped from 24 volts d.c. to 0 volt on turning off the 100 volts a.c. main power supply 87 in order to prevent the aforementioned malfunctions. A relay is provided between the power supply and the driving system as a switch for the function stated above. The relay operates to cut off 24 volts d.c. either when a power good signal (PGS) representing the ON/OFF of the main power 87 supply is cut off or when the upper cover is opened.

By instantaneously dropping the voltage from 24 volts d.c. to 0 volt as above, the driving system is stopped while the control system functions with 5 volts d.c. being applied. Moreover, the fluctuation of the voltage is prevented while the voltage is dropping. Consequently, the motor is prevented from vibrating and hence malfunctioning.

Although a relay is employed as a switch in this embodiment, a semiconductor switch such as an FET can also be employed.

Laser printers are generally provided with a data recovery function for reprinting a blank page due to jamming or the like.

The printer 100 of this embodiment is designed to determine the number of pages to be reprinted (page data) in the driver according to the respective errors: the paper jamming error, the paper empty error detected in a portion other than perforations or when the upper cover UC is opened during printing. Based on the number of pages, the controller 81 requests the host computer to retransmit printing data to be reprinted.

The driver detects the page being printed at present according to the PFS pulse.

There are four kinds of page recovery data to be transmitted; namely, date "0" requiring no recovery, "1" requiring only one whole page which is being transferred to be reprinted, "2" requiring the page being transferred and the page precedingly transferred to be reprinted, and "3" requiring the page being transferred and the preceding two pages to be reprinted.

When trouble occurs on the first page, the page data "1" is transmitted and the controller 81 requests the host computer to transmit data on the page being printed and transmits the data to the driver again after developing it on the buffer.

When trouble occurs on the second page, the third page or thereafter, the respective data is set at "2" or "3" and the controller 81 requests the host computer to transmit data for the pages to be reprinted.

When the opening of the upper cover UC is detected during printing of the third page, the page data is set at "1".

It may otherwise be arranged that the page data for reprinting is not determined by the page that has undergone trouble, as stated above, but by the number of pages to be traced back, depending on the place where jamming has occurred.

Although a reference has been made to the use of continuous sheet whose page length is 11 inches long in the disclosed embodiment, a continuous sheet whose page length is 12 inches long may also be used by changing a counter for counting PFS pulses therefor.

If 12-inch page length sheet is used in this printer 100, some additional arrangements may also be considered such that the last page carrying an unfixed toner image is discharged when the printing is terminated, that the page remained in the printer 100 is fed when printing is restarted, or that a perforated line is located at the fixing unit with the portion one inch from the next perforation being located at the transfer unit 14.

As set forth above, the power supplying device according to the present invention is arranged so that the voltage in the drive system is dropped before that in the control system is dropped. As a result, the drive system is prevented from malfunctioning because of the transient hunting of the voltage in the drive system, the hunting arising when the main power supply is turned off.

The present disclosure relates to subject matter contained in Japanese Patent Applications No. HEI 1-293712 (filed on Nov. 10, 1989) and No. HEI 2-98222 (filed on Apr. 11, 1990) which are expressly incorporated herein by reference in their entireties.

What is claimed is:

1. A power controlling device for controlling a power supplying device to supply power to a plurality of systems, comprising:
   a main switch capable of turning on and turning off said power supplying device;
   controlling means for turning off said plurality of systems in a predetermined order when said power supplying device is turned off by said main switch.

2. The power controlling device according to claim 1, which further comprises signal receiving means capable of receiving a predetermined signal, and wherein said controlling means turns off said plurality of systems when said predetermined signal is received.

3. The power controlling device according to claim 2, wherein said plurality of systems comprises a drive system using a relatively high voltage and another system for controlling said drive system, and wherein said drive system is turned off before said another system is turned off.

4. The power controlling device according to claim 3, wherein said controlling means hold the power supplied to said another system for a predetermined period of time after said power supplying device is turned of by said main switch.

5. The power controlling device according to claim 4, wherein said controlling means comprises switch means for turning said drive system, on and off said switch means being capable of instantaneously cutting off the power applied to said drive system when said main switch is turned off.

6. The power controlling device according to claim 5, wherein said switch means comprises a relay switch.

7. A printer comprising a drive system using a relatively high voltage, a control system using a relatively low voltage for controlling said drive system, and a power supplying device for supplying power to said drive system and to said control system, said printer further comprising:
   a power controlling device capable of turning on and off the power applied to said drive system and to said control system;
   a main switch capable of turning on and turning off said power supplying device; and
   controlling means for turning off said drive system before said control system is turned off when said power supplying device is turned off by said main switch.

8. The printer according to claim 7, wherein said controlling means hold the power supplied to said control system for a predetermined period of time after said power supplying device is turned of by said main switch.

9. The printer according to claim 8, wherein said controlling means comprises switch means for turning and said drive system, on and off said switch means being capable of instantaneously cutting off the power applied to said drive system when said main switch is turned off.

10. The printer according to claim 9, wherein said switch means comprises a relay switch.

* * * * *

UNITED STATES PATENT AND TRADEMARK OFFICE
CERTIFICATE OF CORRECTION

PATENT NO. : 5,061,957
DATED : October 29, 1991
INVENTOR(S) : T. NISHIKAWA et al.

It is certified that error appears in the above-indentified patent and that said Letters Patent is hereby corrected as shown below:

At column 14, line 2 (claim 4, line 4), change "turned of" to ---turned off---.

At column 14, line 30 (claim 8, line 4), change "of" to ---off---.

At column 14, line 34 (claim 9, line 3), change "and said drive system on and off" to ---said drive system on and off,---.

Signed and Sealed this

Sixth Day of September, 1994

Attest:

BRUCE LEHMAN

Attesting Officer

Commissioner of Patents and Trademarks